Oct. 6, 1964    G. MAXON, JR    3,151,849
PORTABLE CONCRETE MIXING AND BATCHING PLANT
Filed Sept. 6, 1963    4 Sheets-Sheet 1

INVENTOR
Glenway Maxon, Jr.
BY
ATTORNEY

Oct. 6, 1964 G. MAXON, JR 3,151,849
PORTABLE CONCRETE MIXING AND BATCHING PLANT
Filed Sept. 6, 1963 4 Sheets-Sheet 4

Inventor
Glenway Maxon, Jr.
By [signature]
Attorney

United States Patent Office 3,151,849
Patented Oct. 6, 1964

3,151,849
PORTABLE CONCRETE MIXING AND
BATCHING PLANT
Glenway Maxon, Jr., 1744 N. Farwell Ave.,
Milwaukee, Wis.
Filed Sept. 6, 1963, Ser. No. 307,083
7 Claims. (Cl. 259—161)

This invention relates to portable concrete batching and mixing plants and refers more particularly to a very compact self-contained vehicle mounted mixing plant.

The general object of this invention is to provide a small to medium size concrete batching and mixing plant that is especially suitable for use in remote and sparsely settled areas, for military work, and for barge mounted installation, and which thus fills an existing gap between the full scale batching plant that constitutes a permanent or semi-permanent installation and the small concrete mixer used for housing construction and the like and which is moved from job to job.

More specific objects of the invention include the provision of such a mixer which is low in first cost, easy and inexpensive to maintain, readily movable from site to site, and easy to erect for operation and to dismantle for transportation.

It is also a specific object of this invention to provide a concrete batching and mixing plant of the character described which constitutes a self-contained unit that is suitable for barge mounting, so as to be useful for river and harbor work, and which can be accommodated on a trailer that is within acceptable size and weight limits for highway transportation.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which.

Figure 1:
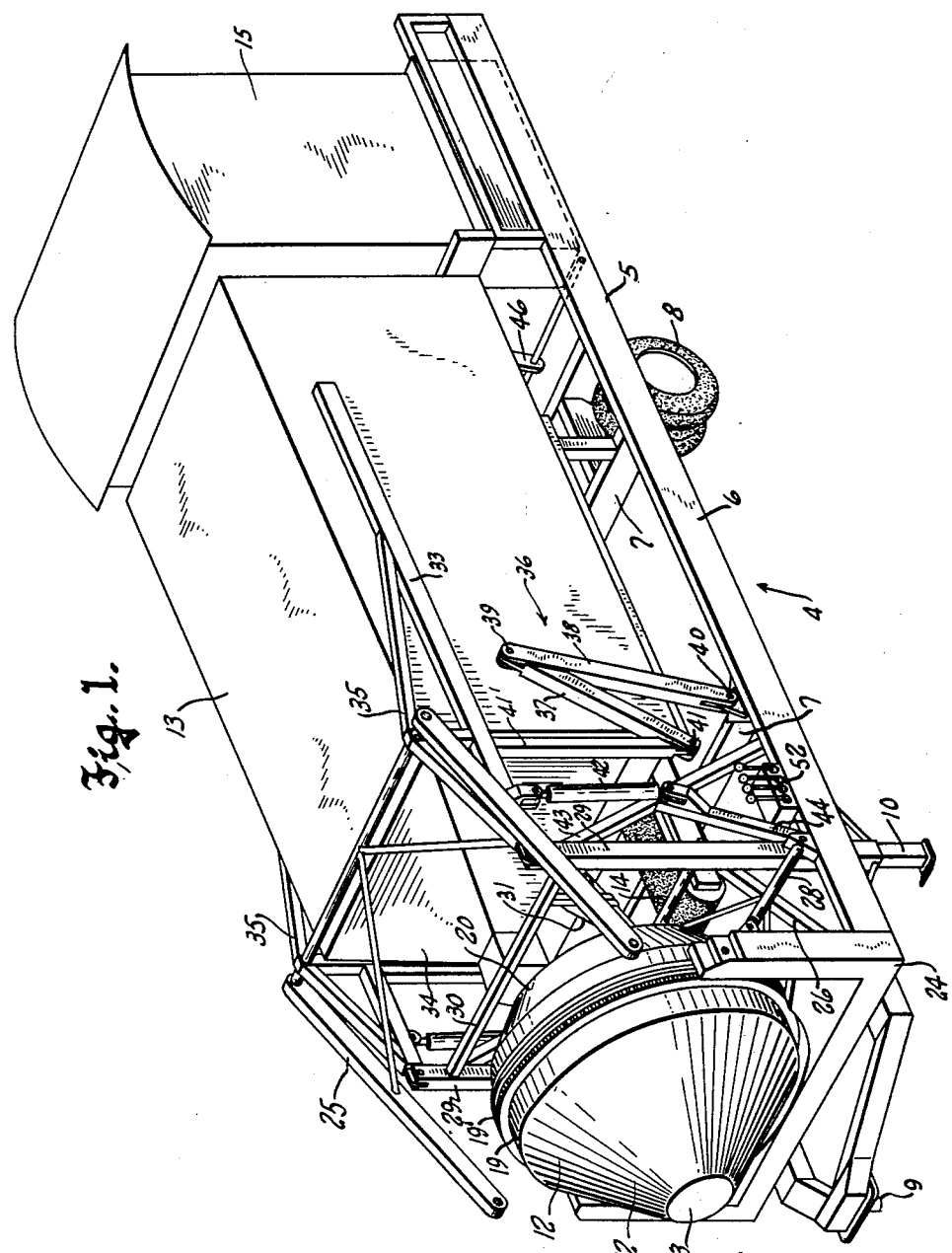
FIGURE 1 is a perspective view of a trailer mounted embodiment of the concrete batching and mixing plant of this invention, shown in its transit condition.

Referring now more particularly to the accompanying drawings, the portable batching and mixing plant of this invention is, by way of illustration, shown as comprising the chassis 4 of a highway trailer, although it could as well be mounted on a railroad car or a barge. The bed or frame 5 of the trailer or other mobile mounting for the apparatus comprises a pair of elongated horizontal members 6 which extend lengthwise of the vehicle and which are held in laterally spaced parallel relationship by transverse frame members 7. Supporting wheels 8, mounted beneath the bed in a conventional manner, and spaced somewhat to the rear of the center of the bed, cooperate with a conventional fifth-wheel connection 9 at the front of the bed to provide for towing the unit from site to site by means of a tractor truck. A suitable retractable supporting leg 10 near the front of the chassis cooperates with the wheels to support the bed with its longitudinal member 6 in level position. Preferably, however, when the apparatus is in use the bed is mounted upon a prepared foundation, or horses, or on cribbing, to afford better stability to it, prevent excessive weight from being imposed upon the wheels, and raise its height so that it can discharge into dump trucks or the like.

Figure 4:
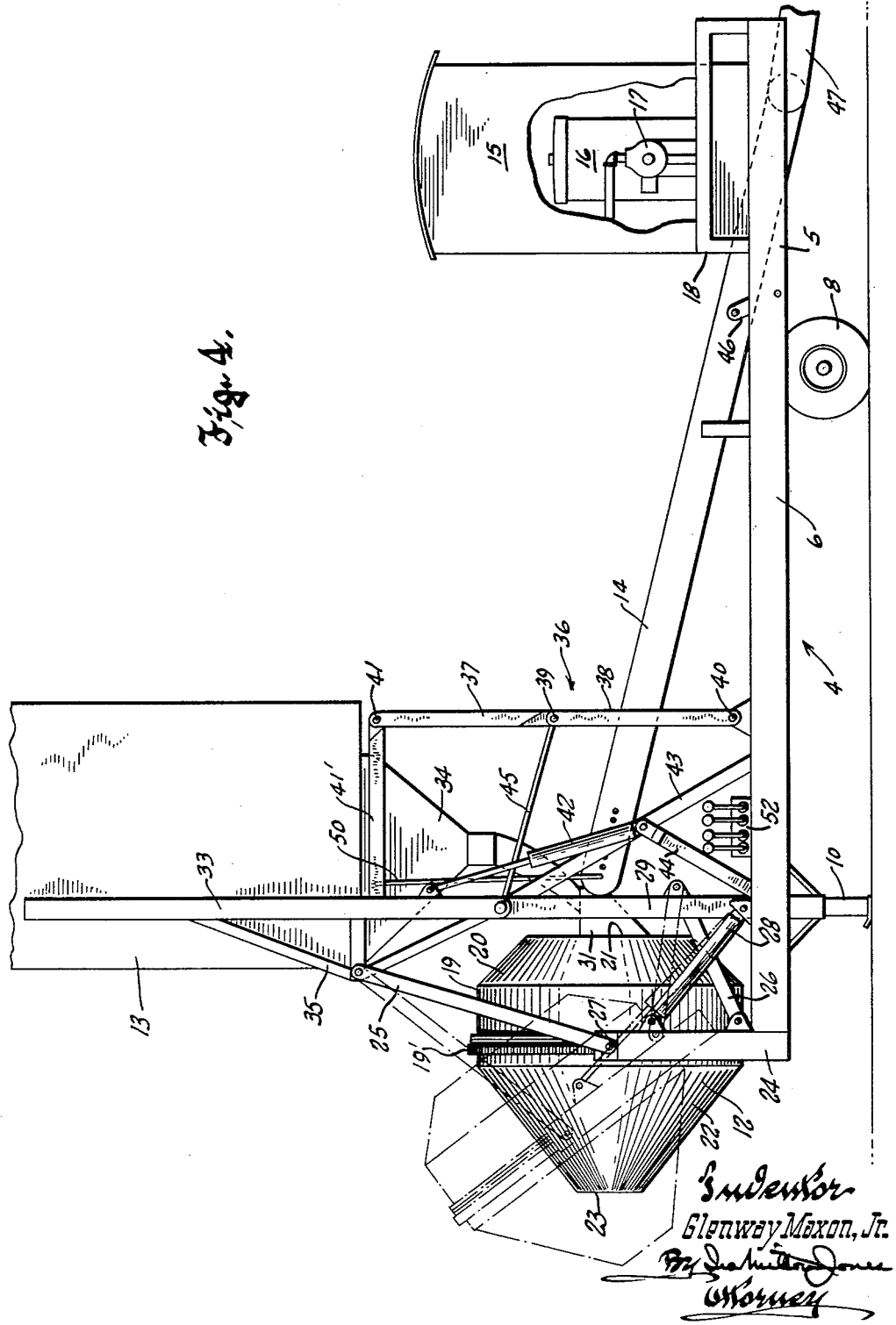
FIGURE 4 is a view similar to FIGURES 2 and 3 but showing the apparatus in its operating condition.

In general the batching plant that is mounted on the bed comprises a mixing drum 12 which is mounted at one end of the chassis for rotation about its axis and for tilting motion between mixing and discharging positions, a cement bin 13 which is movable between a lowered transit position and a raised operative position, a belt conveyor 14 which extends fore-and-aft between the longitudinal frame members 6, and a power plant 15 which is mounted at the opposite end of the bed from the mixing drum. In this case the mixing drum is shown mounted at the front of the chassis while the power plant is at its rear, but this relationship could obviously be reversed. With the mixing drum mounted at the front of the chassis, the fifth wheel connection 9 comprises a detachable unit which is removed when the plant is in mixing operation (compare FIGURES 2 and 4) so as not to interfere with discharge of concrete from the drum into a vehicle thereunder.

Figure 2:
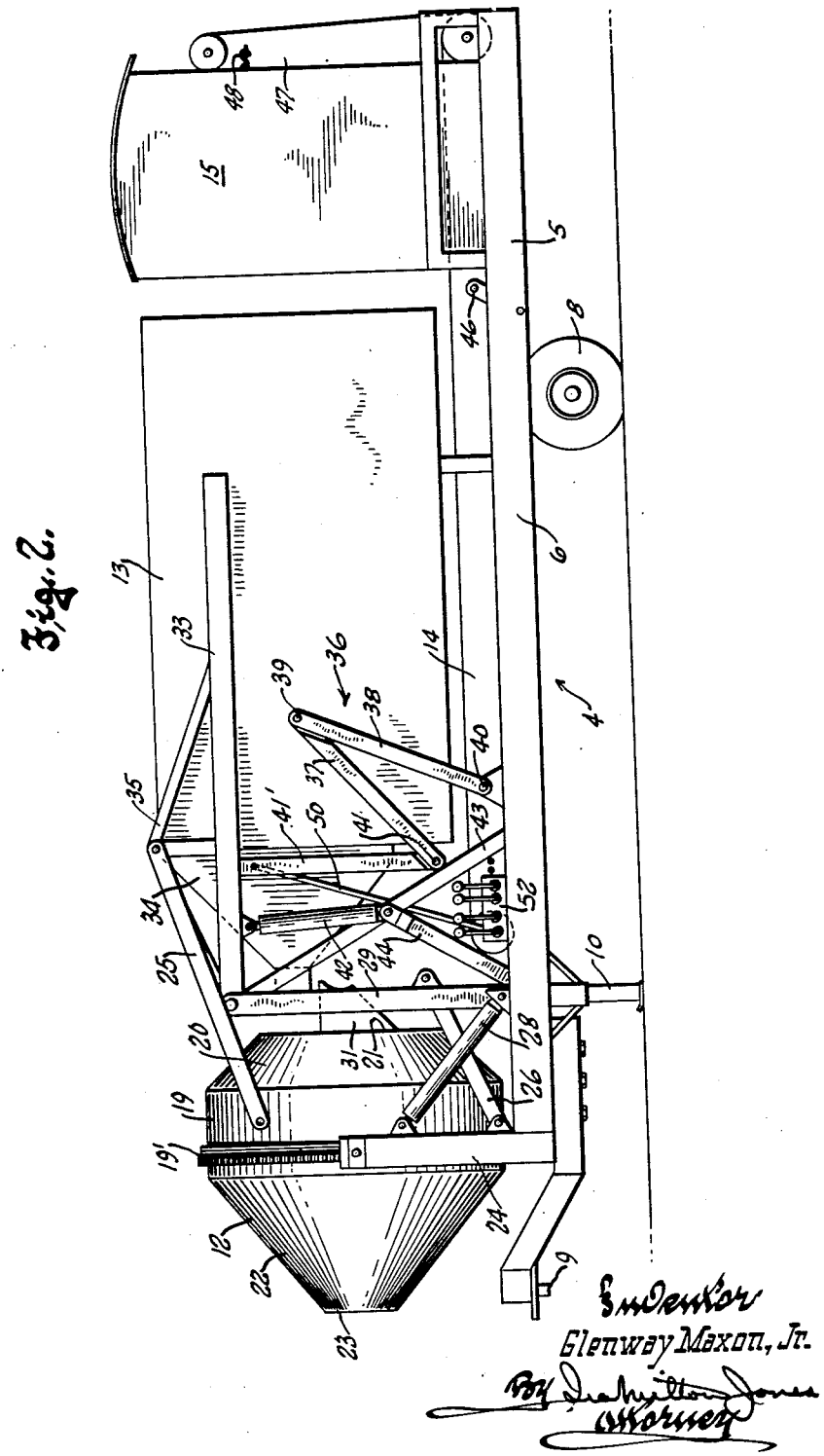
FIGURE 2 is a side elevation view of the batching and mixing plant shown in FIGURE 1, again illustrated in its transit condition.
Figure 3:
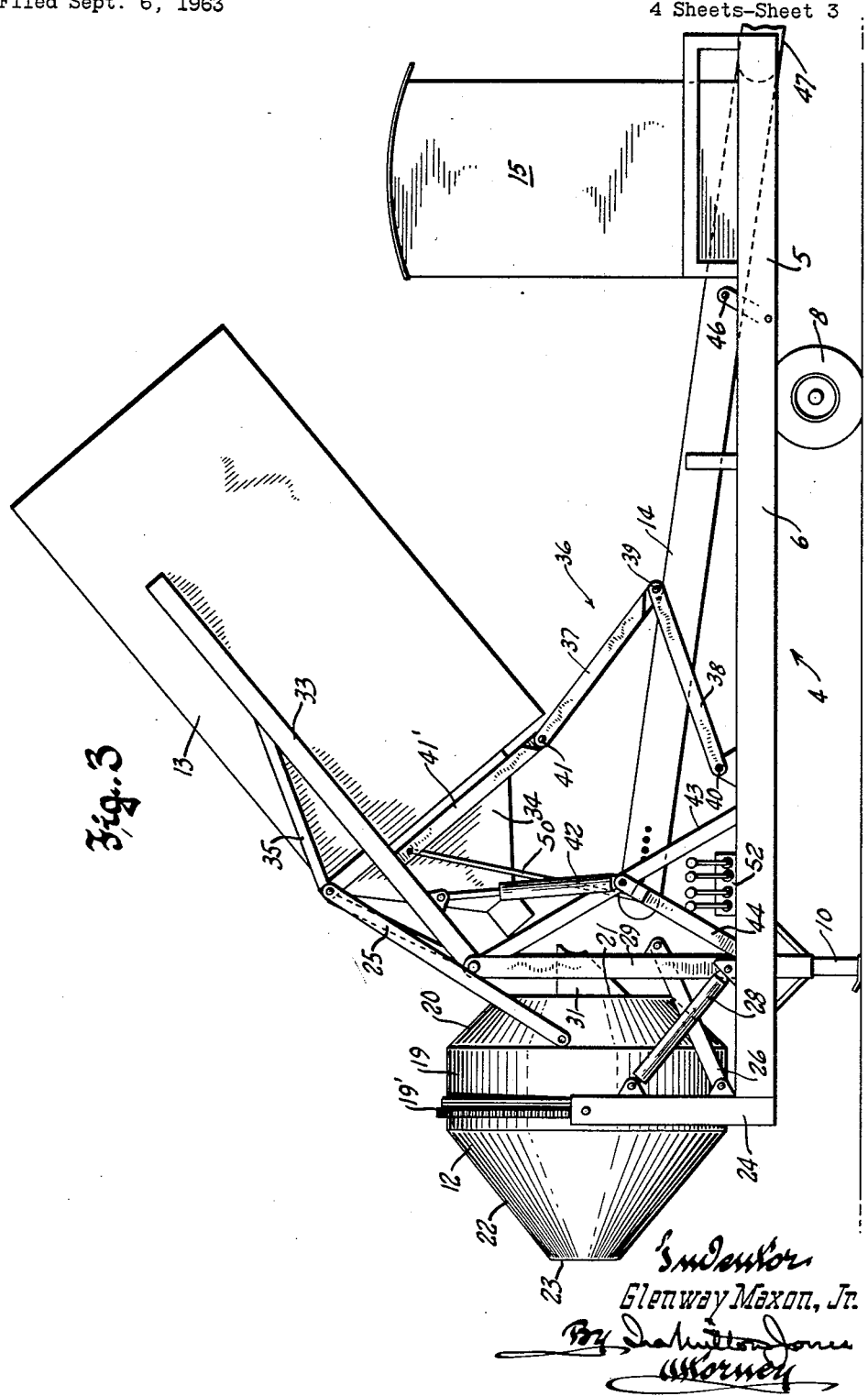
FIGURE 3 is a view similar to FIGURE 2 but showing the apparatus in the course of being converted from its transit condition to its operating condition.

When the apparatus is in its transit condition, illustrated in FIGURES 1 and 2, the normally upright cement bin 13 lies on its side, between the mixing drum 12 and the power plant 15, so that the overall height of the unit is within acceptable limits for highway travel; and the conveyor 14 extends horizontally below the cement bin and the power plant, at about the level of the upper surfaces of the longitudinal frame members 14. With the apparatus in its operating condition (see FIGURE 4) the cement bin is in upright position, just behind the mixing drum and well above the level of the drum axis, while the conveyor is forwardly and upwardly inclined so as to be able to carry aggregate from a conveyor extension 47 that projects beyond the rear of the chassis, near ground level, to a charging chute 31 into which the cement bin also discharges.

The lower portion 34 of the cement bin preferably comprises a weigh batcher by which measured quantities of cement can be released into the charging chute 31 and thus into the mixing drum.

The power plant 15 provides power for all normal operation of the apparatus and also for converting it from transit to operating conditions and vice versa. It comprises a suitable prime mover 16, such as a gasoline or diesel engine, driving a hydraulic pump 17. The apparatus can readily be designed for all-hydraulic actuation so that no external source of power is necessary, with the possible exception of a battery (not shown) for engine starting. Preferably the base 18 of the power plant, which can comprise one of the transverse frame members, is elevated slightly above the tops of the longitudinal frame members 6 to provide space beneath the power plant for the rear end portion of the conveyor 14 when the same is in its transit position.

The mixing drum 12 is conventional in having a central cylindrical portion 19, a rear frustoconical section 20 that tapers to a coaxial charging inlet 21, and a front frustoconical section 22 that tapers to a coaxial discharge outlet 23.

The mixing drum is mounted on the chassis for rotation and for tilting motion in a manner described in Patent No. 3,021,122, issued to Glenway Maxon, Jr. on February 13, 1962, to which reference may be made for further details. Briefly, the medial portion 19 of the drum is nested in a more or less conventional U-shaped tilt frame or cradle 24 which mounts the drum for rotation about its axis. The cradle is suspended from supporting structure behind the drum (described hereinafter) by means of an upper U-shaped link structure 25, which straddles the upper half of the drum, and laterally opposite lower links 26. The upper U-shaped link structure 25 has the lower free ends of its legs pivotally connected, as at 27, to the upper free ends of the legs of the cradle, while the lower links 26 are pivotally connected to the cradle near the junction between its bight portion and its upwardly projecting legs.

The drum is rotated by means of a hydraulic motor, not shown, which drives it through a conventional ring gear 19' around its cylindrical mid-section 19. Tilting of the drum is effected by means of a pair of hydraulic actuating cylinders 28, one at each side of the chassis, each connected between one of the lengthwise extending frame members 6 and its adjacent upright legs of the cradle.

For reasons brought out in the above mentioned patent, the linkage by which the cradle is suspended causes the drum to have a peculiar and very desirable translatory motion concomitantly with its tilting. As the drum begins to tilt towards its discharge positions, it moves bodily forwardly to a substantial extent, so as to clear the charging chute 31, which projects slightly into its charging inlet 21. As tilting of the drum continues, the above described linkage causes the drum to be carried bodily upwardly, so that when the drum is fully tilted to its discharge position, illustrated by broken lines in FIGURE 4, its discharge outlet 23 is only very slightly below the level that it occupies when the drum is in its mixing position. Such combined lifting and tilting of the drum carries it clear of the walls of a dump truck or the like (not shown) into which it is discharging, provides controlled discharge from the drum, and enables the drum to discharge into a relatively small area due to the fact that its discharge outlet travels substantially along the flow path of concrete discharging from the drum.

The entire weight of the drum and a substantial portion of the weight of the cement bin 13 are borne by a pair of rigid, upright structural members or columns 29 that are laterally opposite one another on the chassis, each being secured to one of the longitudinal frame members 6 a short distance from the front end of the bed. Bridging the columns 29 are transverse reinforcing means 30 which also serve to support the charging chute 31.

Pivoted to the top of each column 29 is a swingable leg member 33 which is secured to the side of the cement bin and extends a substantial distance along the length thereof. When the cement bin is swung to its upright operative position, each leg member 33 forms an upward extension of the column 29 to which it is pivoted.

Each swingable leg member 33 is reinforced by a triangular truss 35 at its front side, and to the apexes of these trusses the upper link structure 25 for the drum cradle is pivotally connected at its upper end. When the cement bin is to be swung to its transit position, the pivotal connections 27 between the upper link structure and the cradle 24 are disassembled so that the link structure can rest upon the truss 35 (see FIGURE 1) with the lower ends of its legs spaced above the cradle 24. The cradle is then prevented from tilting forwardly and downwardly by fluid locked in the hydraulic actuators 28, or the upper ends of the cradle legs can be tied to the columns 29.

Cooperating with the uprights 29 to support the cement bin in its operative position are a pair of articulated legs 36, each comprising upper and lower leg sections 37 and 38 that are connected by a knee joint 39. At its lower end, each articulated leg is pivotally connected, as at 40, to one of the longitudinal frame members 6, the connections 40 for the two articulated legs being laterally opposite one another on the chassis and spaced rearwardly from the columns 29. Each articulated leg has, at its upper end, a pivotal connection 41 with the rear end of a horizontal member 41' that is secured to the bottom of the cement bin and is anchored at its front end to its adjacent swingable leg member 33.

Each of the columns 29 is reinforced by means of an inclined brace 43, the upper end of which is anchored to the column near the top thereof and the lower end of which is anchored to the adjacent longitudinal bed member 6, just forward of the pivotal connection 40. Each brace 43 also serves to carry one of a pair of laterally opposite hydraulic cylinders 42 by which lowering and raising of the cement bin is effected, each cylinder having its lower end pivotally connected to the middle of the brace 43 and its upper end pivotally connected to its adjacent swingable leg member 33, a short distance from the joint at the top of the column. From each brace 43, near the connection with its cylinder 42, a diagonal strut 44 extends forwardly and downwardly to the junction between the column and the bed member, so that the strut 44 and brace 43 cooperate to provide a truss structure which receives the reaction forces of the hydraulic cylinder 42 and carries them into the bed.

It will be seen that extension of the hydraulic cylinders 42 swings the cement bin upward toward its operating position, while their retraction swings the bin downward toward its transit position. When the bin is in its operating position, a detachable tie or link 45 (see FIGURE 4) is connected between the pivot at the top of each column 29 and the knee joint 39 of its adjacent articulated leg, to prevent the knee joint from collapsing when pressure is released in the hydraulic cylinders 42.

The conveyor 14, by which aggregate is brought to the charging spout 31, can be of the conventional endless belt type and is supported on a pair of small links 46, the lower ends of which are coaxially pivoted to the longitudinal frame members 6 just forward of the power plant. The conveyor is pivotally connected to the upper ends of the links for tilting to and from its operative position and for a small amount of endwise bodily movement which is accommodated by back and forth swinging of the links. The rear end portion of the conveyor comprises the conveyor extension 47, which is hinged to the main body of the conveyor so that it can be swung to an upright transit position, just behind the power plant, or to a lowered operating position in which the extension 47 is substantially aligned with the main body of the conveyor. The extension can be held in its upright transit position by means of a suitable latch 48.

It will be apparent that the bodily back and forth motion of the conveyor is necessary so that when the conveyor is in transit condition the rear end of its main body portion will be just behind the power plant, to permit the extension 47 to be swung up alongside of the power plant, and so that when it is in its operating position its front end will be closely adjacent to the charging chute 31. With the conveyor in operating condition, the extension portion 47 projects a substantial distance beyond the rear end of the chassis so that it can be readily loaded with aggregate, as from wheelbarrows or from a separate aggregate weigh batcher.

Except for swinging the extension portion 47 to and from its upright transit position, movement of the conveyor between its transit and operating positions is effected automatically by means of a link 50 between the front end portion of the conveyor and the horizontal frame member 41'.

Since all of the actuators for the apparatus can be hydraulic, a suitable control panel 52, for governing all of the actuators, can be placed at any desired location on the chassis, preferably on one of the longitudinal members 6, just behind the mixing drum and below the cement bin, where it is readily accessible to an attendant having all of the operating components of the apparatus in sight.

From the foregoing description taken together with the accompanying drawings it will be apparent that this invention provides a compact and very efficient portable concrete batching and mixing plant having all of its principal components mounted on a single chassis and which, in its transit condition, conforms to generally prevailing size and weight limits for highway vehicles. It will also be apparent that the apparatus of this invention can be very quickly and easily converted from transit to operating condition, and vice versa, with a minimum of manual labor.

What is claimed as my invention is:

1. A vehicle mounted portable concrete mixing plant comprising:
    A. a pair of elongated horizontal chassis members;
    B. means holding said chassis members in substantially parallel, laterally spaced apart relationship and cooperating with the chassis members to define an elongated vehicle bed;
    C. a mixing drum having a coaxial charging inlet at its rear and a coaxial discharge outlet at its front;
    D. means mounting the mixing drum on the bed, at one end thereof, for rotation of the drum about its axis and for tilting motion of the drum between a mixing position in which the axis of the drum is horizontal and its inlet faces inwardly of the bed, and a discharging position in which the outlet of the drum is lowermost and is spaced outwardly of said end of the bed;
    E. a power plant on the bed, near the other end thereof, providing a source of power for rotating and tilting the mixing drum;
    F. a cement bin having an outlet at its bottom;
    G. means mounting the cement bin on the bed, inwardly adjacent to the mixing drum, for bodily movement between a lowered transit position and a raised operative position;
    H. conveyor means extending lengthwise between the chassis members and bodily tiltable between a substantially horizontal transit position, in which the conveyor means lies close to the chassis members, and an inclined operative position in which the higher end of the conveyor means is adjacent to the inlet of the mixing drum and beneath the outlet of the cement bin while the lower end of the conveyor means is adjacent to and beneath the power plant;
    I. linkage means constraining the cement bin and conveyor means to move in unison between their operative and transit positions; and
    J. power actuator means connectable with the power plant for moving the conveyor means and cement bin between their operative and transit positions.

2. The concrete mixing plant of claim 1, further characterized by an extension conveyor section at said other end of the bed swingable between an upright transit position and an inclined operative position in which the higher end of said extension conveyor section is closely adjacent to the lower end of the conveyor means and the lower end portion of the extension conveyor section projects beyond said other end of the bed.

3. The concrete mixing plant of claim 1, further characterized by:
    A. a pair of laterally opposite upright supporting members, each fixed to one of the chassis members near the first designated end of the bed;
    B. a charging chute fixed to said upright supporting members beneath the outlet of the cement bin and having
        (1) a discharge end portion adjacent to the inlet of the mixing drum when the latter is in its mixing position and
        (2) an inlet end portion which is adjacent to the upper end of the conveyor means when the latter is in its operative position,
    so that the charging chute can transfer to the mixing drum cement from the cement bin and aggregate from the conveyor means.

4. The portable mixing plant of claim 3, further characterized by:
    A. laterally opposite swingable cement bin supports, secured to the cement bin at opposite sides thereof and each having a jointed connection to the top of one of said upright supports, whereby the cement bin is carried for swinging motion between an upright operative position and a horizontal transit position wherein the cement bin overlies the medial portion of the bed with its bottom adjacent to the mixing drum and its top adjacent to the power plant; and
    B. a pair of laterally opposite jointed legs for cooperating with the upright supports to hold the cement bin in its operative position, each of said jointed legs having at one end a pivotal connection to the cement bin and at its other end a pivotal connection to the bed that is spaced lengthwise inwardly along the bed from said upright supports, each of said jointed legs also having a pivoted joint intermediate its ends by which the leg is foldable to permit the cement bin to swing to its transit position.

5. The portable mixing plant of claim 4, wherein the power actuator means for moving the cement bin between its operative and transit positions comprises a hydraulic jack cylinder at each side of the bed, further characterized by:
    A. a diagonal brace rigidly connected to each of said upright supports, near the top thereof, and to its adjacent horizontal chassis member, near the pivotal connection thereto of its adjacent jointed leg;
    B. means pivotally connecting each hydraulic jack to one of said diagonal braces, near the middle thereof, and to its adjacent swingable supporting member; and
    C. a strut extending from near the middle of each diagonal brace to the junction between its adjacent chassis member and upright supporting member.

6. In a vehicle mounted portable concrete mixing plant:
    A. a pair of elongated horizontal chassis members;
    B. means holding the chassis members in substantially parallel, laterally spaced apart relationship and cooperating with the chassis members to define an elongated vehicle bed;
    C. a mixing drum having a coaxial charging inlet at its rear and a coaxial discharge outlet at its front;
    D. means mounting the drum on the bed, at one end thereof, for rotation of the drum about its axis and for tilting motion of the drum between a mixing position in which the axis of the drum is horizontal and its inlet faces inwardly of the bed, and a discharging position in which the outlet of the drum is lowermost and is spaced outwardly of said end of the bed;
    E. a cement batcher having an outlet at its bottom;
    F. means mounting the cement batcher on the bed, inwardly adjacent to the mixing drum, for bodily movement between a lowered transit position and a raised operative position;
    G. power means for raising the cement batcher to its operative position and lowering it to its transit position; and
    H. conveyor means extending lengthwise between the chassis members and bodily tiltable between a substantially horizontal transit position, in which the conveyor means lies close to the chassis members, and an inclined operative position in which the higher end of the conveyor means is adjacent to the inlet of the mixing drum and beneath the outlet of the cement batcher while the lower end of the conveyor means is nearer the other end of the bed and below the level of the chassis members.

7. The portable concrete mixing plant of claim 6, further characterized by: linkage means connecting the cement batcher with the conveyor means to constrain the conveyor means to move to its operating and to its transit positions in unison with raising and lowering movement, respectively, of the cement batcher.

References Cited in the file of this patent
UNITED STATES PATENTS

| | | |
|---|---|---|
| 2,269,561 | Strayer | Jan. 13, 1942 |
| 2,806,680 | August | Sept. 17, 1957 |
| 2,856,165 | Gordtney | Oct. 14, 1958 |